United States Patent Office 3,352,978
Patented Nov. 14, 1967

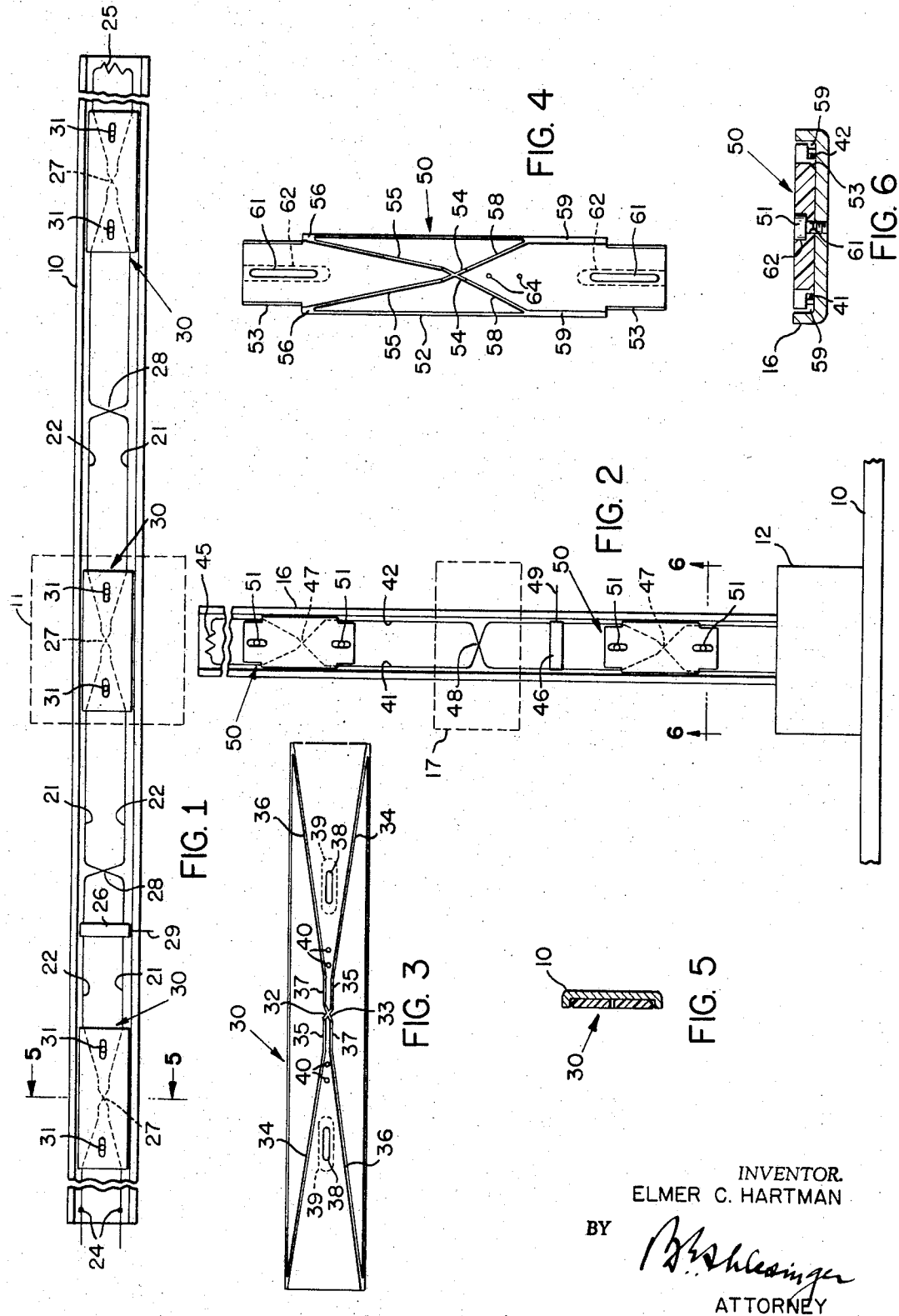

3,352,978
AUTOMATED STORAGE APPARATUS
Elmer C. Hartman, Fairport, N.Y., assignor to Hartman Metal Fabricators, Inc., Waterloo, N.Y., a corporation of New York
Filed Sept. 7, 1965, Ser. No. 485,408
13 Claims. (Cl. 191—22)

This invention relates to storage apparatus, particularly to load transfer mechanism for moving a load from a pick-up and discharge station to a selected bay or bin of a storage rack which has a plurality of bays arranged in horizontal and vertical rows. More particularly, this invention relates to control means for determining the positions at which the transfer mechanism stops in order to deliver a load to, or to retrieve a load from, a preselected bay in a storage rack.

In any load transfer system where the load carrier is designed to transfer a load from a pick-up and discharge station, or from a particular bay of a storage rack and to transfer that load to a selected bay, or is designed to pick up a load from one bay of the rack and to transfer it to another bay or to the pick-up and discharge station, it is essential that the load carrier be centered precisely with respect to the particular bay in which it is to deposit, or from which it is to withdraw the load.

In the copending application of Burnight and Burch, Ser. No. 349,217, filed Mar. 4, 1964, and assigned to the same assignee as the instant application, there is illustrated a centering means utilizing two control sets, one of which determines the vertical location of the bin or bay, to which a load is to be transferred or from which a load is to be picked up, and the other of which determines the horizontal position of this bay. Means is provided for preselecting the two coordinates of any given bay before the carrier leaves the load station so that after the dispatched carrier has moved a predetermined distance horizontally and vertically, it will stop in front of the preselected bay. The device of the present application is intended to operate according to the principle of the Burnight and Burch application, but provides in a specific detail, means for increasing the precision of operation of the Burnight and Burch apparatus.

An object of this invention is to provide improved control means for apparatus of the type described, wherein an automatically operated carrier may be halted in exact registry with a preselected bay of a storage rack or in a preselected position.

Another object of this invention is to provide control means for apparatus of the type described, which may be adjusted after final assembly of the carrier relative to the storage rack, to assure precise positioning of the carrier in its delivery and retrieving functions.

Other objects of the invention will be apparent hereinafter from the specification and from the recital of the appended claims, particularly when read in conjunction with the accompanying drawing.

In the drawing:

FIG. 1 is a fragmentary plan view showing devices made according to one embodiment of this invention mounted on a horizontal track to control adjustably the horizontal movement of a load transferring carriage;

FIG. 2 is a fragmentary elevational view showing devices made according to the invention mounted on the vertical track or mast of a carriage to control adjustably the vertical movement of an elevator that is mounted for vertical reciprocating movement on the carriage;

FIG. 3 is a plan view on an enlarged scale of one of the adjustable cross-over plates, or control devices illustrated in FIG. 1;

FIG. 4 is an elevational view of one of the cross-over plates, illustrated in FIG. 2;

FIG. 5 is an enlarged sectional view taken along line 5—5 in FIG. 1 looking in the direction of the arrows; and FIG. 6 is an enlarged sectional view taken along the line 6—6 in FIG. 2, and looking in the direction of the arrows.

In load transfer mechanism operating according to the control system of the Burnight and Burch application the carriage is power-driven along a horizontal track and the elevator is separately power-driven vertically on a mast carried by the carriage. A carrier may be mounted on the elevator to carry the load into or out of the storage bins of the rack. Two conductors, which are connected to a source of alternating current, are disposed to be generally parallel to the direction of travel of the carriage; and two conductors, which are also connected to a source of alternating current, are disposed to be generally parallel to the direction of travel of the elevator. The two conductors of each pair are crossed at spaced points along their lengths, the spacing of the crossings depending, for instance, upon the spacing of the bins of the storage rack, horizontally in one case and vertically in the other.

The cross-over points of the conductors are known as "stable nulls" and the points where the conductors are recrossed to return to their original relative positions are termed "unstable nulls." A transducer is connected to the carriage to travel over the associated conductors as the carriage moves along its track; and a second transducer is connected to the elevator to travel over the conductors associated with it as it ascends or descends on the carriage mast.

Counting mechanism is used to preselect which "stable null" of one set is to be utilized for stopping the carriage, and which "stable null" of the other set is to be utilized for stopping the elevator. By counting the "stable null" points until the area of the selected "stable null" is reached, each transducer may be used to provide a signal to cause the carriage or elevator, as the case may be, to stop at the selected "stable null" position registering precisely with the selected bay of the rack into or from which a load is to be transferred. As either transducer approaches the selected "stable null" it operates through a circuit such as described in the Burnight and Burch application to slow down the carriage or elevator as the case may be. If it overruns the "stable null," the carriage or elevator will be reversed and return to the "stable null" due to the crossing of the conductors.

Referring now to the drawing by numerals of reference, 10 denotes a channel-type rail or track along which a carriage 11, shown in phantom only as a block in FIG. 1, is moved between a combination loading and discharge station and the preselected bay to which the load is to be delivered or from which it is to be picked up. The trolley section 12 of this carriage (shown diagrammatically in block form but in full lines in FIG. 2) carries a vertical mast or track 16 of channel form, along which an elevator is reciprocable vertically. The elevator is indicated diagrammatically in FIG. 2 by the dotted block 17. The channel 10 usually extends down the center of an aisle, between two storage racks, each of which contains a plurality of horizontally and vertically arranged storage bays or bins.

Mounted on a flat, dielectric surface formed on the bottom of the channel 10 are two insulated conductors 21 and 22. At one end of the channel 10 these conductors are connected through terminals 24 to a suitable source of alternating current. At the opposite end of the channel 10 these conductors are connected across a resistor 25. The conductors are parallel to one another along spaced portions of their length, but at selected points intermediate their ends, they are crossed as at 27 to form "stable nulls," successive ones of which register, respectively, with successive columns of bays of the storage rack. At opposite sides of each crossing 27, therefore, the wires are transposed relative to one another.

Between adjacent nulls 27, the conductors 21 and 22 are crossed back, as at 28, to return to their original relationship. The crossing points 28 are "unstable nulls."

The conductors 21 and 22 transmit signals through a transducer 26 movable with trolley 12, and a conductor 29, to a sensor on the carriage 11 to control its movement.

Similarly there are mounted on a flat, dielectric surface formed in the channel of mast 16 two conductors 41 and 42, which are connected to one another across a resistor 45 adjacent one end of channel 16, and adjacent the opposite end of the channel are connected across on A.C. voltage supply in much the same manner as the conductors 21 and 22. At selected intervals intermediate their ends the conductors 41 and 42 are crossed as at 47 and 48, respectively, to form at alternate points "stable" and "unstable" nulls, respectively, like those of conductors 21 and 22. A transducer 46, which travels over conductors 41 and 42 as the elevator ascends or descends, and a lead wire 49 therefrom serve to operate a signal to stop the elevator at a preselected "stable null" when a counting mechanism or similar control device counts off from the pick-up and discharge station the number of "stable nulls" to the selected "stable null."

Where the conductors 21 and 22 or 41 and 42 cross to form a "stable null" 27 or 48, they are adjustably secured in the channels 10 and 16, respectively, by plates 30 and 50, which are secured face down in the channels by screws 31 and 51, respectively.

Referring now to FIGS. 3 and 5, each plate 30 is rectangular, and is made from a substantially rigid, dielectric material such as that sold under the trademark Insurok T 610. In its center, each plate 30 is provided with a small, X-shaped aperture formed by a pair of intersecting slots 32 and 33. Each plate 30 is provided with a first pair of aligned diagonally disposed grooves 34, which extend inwardly from diagonally opposite corners of the plate, and which are connected at their inner ends to opposite ends, respectively, of the slot 32, by a second pair of grooves 35. Each plate 30 also has a further pair of diagonally aligned grooves 36, which extend diagonally inwardly from the remaining two corners of the plate, and which are connected at their inner ends to opposite ends, respectively, of the slot 33 by two grooves 37. The grooves 35, as do the grooves 37, lie on opposite sides, respectively, of the longitudinal centerline of the associated plate 30, and are parallel to one another.

Each plate 30 has two elongate slots 38, which are disposed between the grooves 34 and 36, and which extend parallel to and register with the longitudinal centerline of the plate. The rear face of each plate 30 is recessed as at 39 around each of the slots 38 to accommodate the heads of screws 31 by which the plate may be fastened to channel 10. Adjacent the inner end of each slot 38 each plate 30 is also provided with holes 40 for receipt of a tool for adjusting the plate longitudinally.

Referring now to FIGS. 4 and 6, each of the plates 50 is made of the same material as the plates 30, and comprises an elongate, generally rectangular body portion 52, and integral end portions 53, which project beyond opposite ends of the body portion, and which are slightly narrower than the body portion. At its center, each plate 50 has therethrough a small X-shaped aperture formed by a pair of intersecting slots 54.

The body portion 52 of each plate 50 has at one side of its midpoint (the upper side in FIG. 4) a pair of spaced grooves 55, which converge diagonally inwardly from recesses 56 formed in the corners of the body portion 52 at one end thereof, and each of which communicates at its inner end (lower end in FIG. 4) with one end of one of the slots 54. The grooves 55 are inclined to one another at a smaller angle than the angle between the slots 54. At the opposite side of its midpoint (the lower side in FIG. 4) the body portion 52 of each plate 50 has a further pair of grooves 58, each of which registers at its inner end with one end (the lower end in FIG. 4) of one of the slots 54, and at its opposite end with the inner end of one of a pair of parallel, marginal recesses 59 formed along opposite sides of the body portion 52. Each groove 58 is inclined relative to the longitudinal centerline of the associated plate to the same extent as is the slot 54 with which it registers, whereby the included angle between the grooves 58 is the same as that between the slots 54.

Each end portion 53 of each plate 50 has therethrough an elongate slot 61 for accommodating the fastening screw 51. Each of these slots 61 extends parallel to and registers with the longitudinal centerline of its associated plate 50; and the rear face of each plate 50 is recessed as at 62 around the marginal edges of each slot 61 to accommodate the head of one of the fastening screws 51. Between the grooves 58 two holes 64 are located along the centerline of each plate 50 for accommodating a tool as below described.

Each plate 30 and 50, respectively, is just wide enough so that it will fit snugly, but slidably, between the sides of its respective channel 10 or 16.

In use, each plate 30 is secured face down over a "stable null" 27 so that as illustrated by broken lines in FIG. 1 the conductor 21, for instance, is held in the slot 32 by the registering grooves 34 and 35, and the other conductor 22 is held in the slot 33 and the grooves 36 and 37. The slots 32 and 33 permit the conductors to cross one another without getting out of the grooves 34, 36.

To adjust the location of a null 27, the screws 31 of the associated plate 30 are loosened, after which the plate may be shifted manually in one direction or the other longitudinally within the channel 10, thereby causing a corresponding shifting of the crossover point of the wires 21 and 22, but without altering the configuration of the wires at opposite sides of the crossover point, as determined by the configuration of the guiding grooves 34 to 37. The result is that a slight change will be effected in the ultimate position, relative to the storage rack, which the carriage 11 will assume upon being halted by the null 27. The inclination of the grooves 34, 36 determines the rate at which the carriage slows down prior to stopping; and the length of these grooves determines how long the slow-down takes and when it begins to occur.

In a similar manner, each plate 50 is mounted over the conductors 41 and 42 at a respective "stable null" 47, so that the portion of the conductors beneath the plate will be held in crosswise relationship in the slots 54 by the grooves 55 and 58. In practice each plate 50 is secured in the vertical channel 16 with its grooves 58 down. The reason for this is that while gravity assists in halting the upward movement of the elevator 17 upon upward movement thereof; the force of gravity constitutes an additional force which must be overcome as the elevator section 17 approaches the selected bay during its downward movement. For this reason the signal which is transmitted by the conductors 41 and 42 to bring about a halting of the elevator section 17 during its downward movement, must commence much sooner and be of greater duration, than would be necessary were the elevator travelling upwardly. The portions of the conductors 41 and 42 which are seated in the grooves 55 produce these last-named signals, and are therefore greater in length in the longitudinal direction of the plate 50, than are the portions of the wires which lie in the grooves 58, and which transmit the signals for halting the elevator 17 during the upward travel thereof.

To adjust a respective plate 50, its screws 51 are loosened, after which the plate is shifted vertically in the channel 16 to effect a slight change in the position of the associated nulls 47, in much the same manner as above-described with respect to the "nulls" 27. After adjustment, the screws 51 are once again tightened.

From the foregoing it will be apparent that applicant has devised a relatively simple and inexpensive means for individually adjusting the "stable nulls" 27 and 47 in a control mechanism of the type described. These nulls function as coordinates to represent the location of each bay in a respective storage rack. Therefore, if after final assembly of the storage apparatus the associated control means fails to halt the carriage 11 or elevator 17 in proper registry with a preselected bay, or column of the storage rack, one need only to adjust the plates 30 and 50 to effect precise positioning of the carriage and elevator with selected bays in the rack. The adjustable plates 30 and 50 permit of compensating for the variances in bins spacing etc. that occur due to normal manufacturing tolerances. Moreover, the plates 30 and 50 permit the associated signal means to be adjusted to compensate for any wear and tear, which over an extended period of use of the apparatus, may tend to produce slight misalignments of the conveyor sections relative to selected bays in the racks.

During adjustment, a pointed instrument may be inserted into one of the openings 40 or 64 in the plates 30 and 50, respectively, to make it easier to shift the plate.

While specific configurations of the grooves 31, 32, 55 and 58 have been illustrated herein, it is to be understood that the length, and the angle of inclination of each such groove with respect to the longitudinal centerline of a plate may be varied, depending upon the rate at which the carriage and elevator are operated, and the weights of the loads to be handled thereby.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a conveyor control mechanism having a signal source defined by a pair of conductors which cross one another at predetermined points along their lengths,
    (a) a first, elongate member for supporting said conductors,
    (b) a second member mounted on said first member for adjustment longitudinally thereof, and
    (c) means on said second member engaging said conductors adjacent a point where they cross one another, and operative upon the longitudinal adjustment of said second member relative to said first member to shift the last-named point longitudinally of said first member.

2. In a conveyor control mechanism having a signal source defined by a pair of conductors which cross one another at predetermined points along their lengths,
    (a) a first, elongate member for supporting said conductors,
    (b) a second member mounted on said first member for adjustment longitudinally thereof, and
    (c) means on said second member for holding said conductors at a predetermined angle of intersection at a point where they cross one another, and slidable relative to said conductors to shift the last-named point longitudinally of said first member without changing said angle, when said second member is shifted longitudinally of said first member.

3. In a conveyor control mechanism having a signal source defined by a pair of wires, which are supported on a plane, elongate surface, and which at predetermined points along their lengths cross one another at predetermined angles,
    (a) a plate having in its face a pair of grooves, which intersect one another at angles corresponding to said predetermined angles, and each of which grooves is adapted to house one of said wires, and
    (b) a pair of screws adjustably securing said plate face down on said plane surface over one of said points with the crossed wires therebeneath seated in said grooves,
    (c) each of said screws passing through one of a pair of elongate slots formed in said plate adjacent opposite ends thereof, respectively, and
    (d) each of said slots extending in the direction of the length of said plane surface, whereby upon the loosening of said screws, said plate may be shifted longitudinally of said plane surface to effect a corresponding shifting of the point where said wires cross beneath said plate.

4. In the conveyor control mechanism as defined in claim 3, wherein
    (a) said plate has therethrough a further pair of slots which intersect one another at the point of intersection of said grooves, and
    (b) a portion of one of said wires is housed in one of said further pair of slots, and
    (c) a portion of the other of said wires is housed in the other of said further pair of slots in overlapping, transverse relation to the first-named portion.

5. In the conveyor control mechanism as defined in claim 3, wherein said plate is made of a plastic, dielectric material.

6. In a conveyor control mechanism having a signal source defined by a pair of wires, which are supported on a plane, elongate surface, and which at predetermined points along their lengths cross one another at predetermined angles,
    (a) a plate having in its face a pair of grooves, which intersect one another at angles corresponding to said predetermined angles, and each of which grooves is adapted to house one of said wires, and
    (b) means for securing said plate face down on said plane surface over one of said points for limited adjustment in opposite directions longitudinally of said plane surface, and with the crossed wires therebeneath seated in said grooves, and
    (c) said grooves having first portions thereof which converge inwardly from adjacent one end of said plate toward the center of the plate, and concentrically of its longitudinal centerline, to form therebetween a first acute angle, which faces said one end of said plate, and having second portions thereof which converge inwardly from the opposite end of said plate concentrically of said centerline, and which form therebetween a second acute angle facing said opposite end of said plate.

7. In the conveyor control mechanism as defined in claim 6, wherein said first and second acute angles are equal.

8. In the conveyor control mechanism as defined in claim 6, wherein one of said first and second acute angles, respectively, is larger than the other.

9. In the conveyor control mechanism as defined in claim 6 wherein
    (a) said plate has in its center a pair of intersecting identical slots, each of which is inclined a like amount to said plate centerline to form an X-shaped aperture in said plate,
    (b) said slots define therebetween a pair of equal and opposite acute angles, which face opposite ends, respectively, of said plate,
    (c) said first portions of said grooves are connected at their inner ends with the ends of said slots which face said one end of said plate, and
    (d) said second portions of said grooves are connected at their inner ends with the ends of said slots which face said opposite end of said plate.

10. In the conveyor control mechanism as defined in claim 9, wherein each of said first and second portions of said grooves open at their inner ends on said slots.

11. In the conveyor control mechanism as defined in claim 9, wherein each of said first and second portions of said grooves are connected to said slots by further, parallel portions of said grooves, each of which communicates at one end thereof with the inner end of one of said first and second portions, respectively, and which opens at its opposite end on one of said slots.

12. In the conveyor control mechanism as defined in claim 10, wherein
 (a) one of said first and second acute angles, respectively, is larger than the other, and
 (b) said other acute angle is equal to one of said pair of equal and opposite angles formed by said slots.

13. In the conveyor control mechanism as defined in claim 11, wherein
 (a) said first and second acute angles are equal, and
 (b) said further portions of said grooves are substantially shorter in length than said first and second portions thereof.

References Cited
UNITED STATES PATENTS

| | | | |
|---|---|---|---|
| 2,135,344 | 11/1938 | Johnston | 174—33 |
| 2,305,688 | 12/1942 | Goddard | 174—33 |
| 2,961,585 | 11/1960 | Brouwer | 318—466 X |
| 3,194,873 | 7/1965 | Demmel et al. | 174—34 |

ARTHUR L. LA POINT, *Primary Examiner.*

S. T. KRAWCZEWICZ, *Assistant Examiner.*